United States Patent
Manzi et al.

(10) Patent No.: US 12,425,435 B1
(45) Date of Patent: Sep. 23, 2025

(54) ARTIFICIAL INTELLIGENCE FOR CYBER THREAT INTELLIGENCE

(71) Applicant: FORESCOUT TECHNOLOGIES, INC., San Jose, CA (US)

(72) Inventors: Alessandro Manzi, Vecchiano (IT); Andres Felipe Castellanos Paez, Noisy-le-Grand (FR); Elisa Costante, Eindhoven (NL)

(73) Assignee: Forescout Technologies, Inc., San Jose, CA (US)

( * ) Notice: Subject to any disclaimer, the term of this patent is extended or adjusted under 35 U.S.C. 154(b) by 0 days.

(21) Appl. No.: 18/975,340

(22) Filed: Dec. 10, 2024

(51) Int. Cl.
G06F 21/57 (2013.01)
G06F 16/2452 (2019.01)
H04L 9/40 (2022.01)

(52) U.S. Cl.
CPC .... H04L 63/1425 (2013.01); G06F 16/24522 (2019.01); G06F 21/577 (2013.01)

(58) Field of Classification Search
None
See application file for complete search history.

(56) References Cited

U.S. PATENT DOCUMENTS

| | | | |
|---|---|---|---|
| 12,107,885 B1* | 10/2024 | Kawasaki | H04L 63/1416 |
| 2024/0256622 A1* | 8/2024 | Abrams | G06F 16/9538 |
| 2024/0378395 A1* | 11/2024 | Sommers | H04L 41/08 |
| 2024/0414191 A1* | 12/2024 | Humphrey | H04L 63/205 |

* cited by examiner

Primary Examiner — Fatoumata Traore
(74) Attorney, Agent, or Firm — Womble Bond Dickinson (US) LLP

(57) ABSTRACT

A system includes a processing device, operatively coupled to memory, to receive a prompt that is associated with a potential security threat on a computer network. The system applies a first large language model (LLM) to the prompt to generate a first instruction that is associated with a first agent that is to handle the first instruction, and routes the first instruction to the first agent. The first agent applies a second LLM in association with a first data source to obtain a first data that is associated with the potential security threat. The system applies a third LLM at least to the first data, to generate a data output that is associated with the potential security threat on the computer network.

16 Claims, 6 Drawing Sheets

ARTIFICIAL INTELLIGENCE FOR CYBER THREAT INTELLIGENCE

TECHNICAL FIELD

Aspects and implementations of the present disclosure relate to network monitoring, and more specifically, to using artificial intelligence to analyze cyber threat intelligence.

BACKGROUND

Computing devices may communicate with each over a computer network. In a computer network, computing devices can be communicatively coupled to each other over physically wired, optical, or wireless radio-frequency technology. As technology advances, the number and variety of devices that communicate over computer networks increase, as does the amount of data and importance of such data on each computing device. Protection of computing devices and the data against malicious attacks, is a central concern. Computer networks and devices may be analyzed and security risks may be mitigated.

Analyzing threat intelligence information presents several challenges for threat analysts, each of which impacts the effectiveness, efficiency, and relevance of the intelligence applied to protect an organization's digital assets. The amount of Threat Intelligence (TI) data can be overwhelming. Due to the size and complexity of the TI data, analysts may have difficulty in discerning whether the data indicates a threat or is benign.

TI data may include indicators of compromise (IoCs), Common Vulnerabilities and Exposures (CVEs), threat actors, threat actor tactics, techniques, and procedures (TTPs), and vulnerabilities. Timeliness is also a key factor with respect to responding to TI data. TI data that is may quickly become obsolete if not analyzed and acted upon promptly. Analysis of TI data should be contextualized to a specific organization's environment, assets, and risk profile, to effectively identify whether or not the TI data indicates a risk in that context. Customizing intelligence to align with organizational priorities is challenging but essential for effective security.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
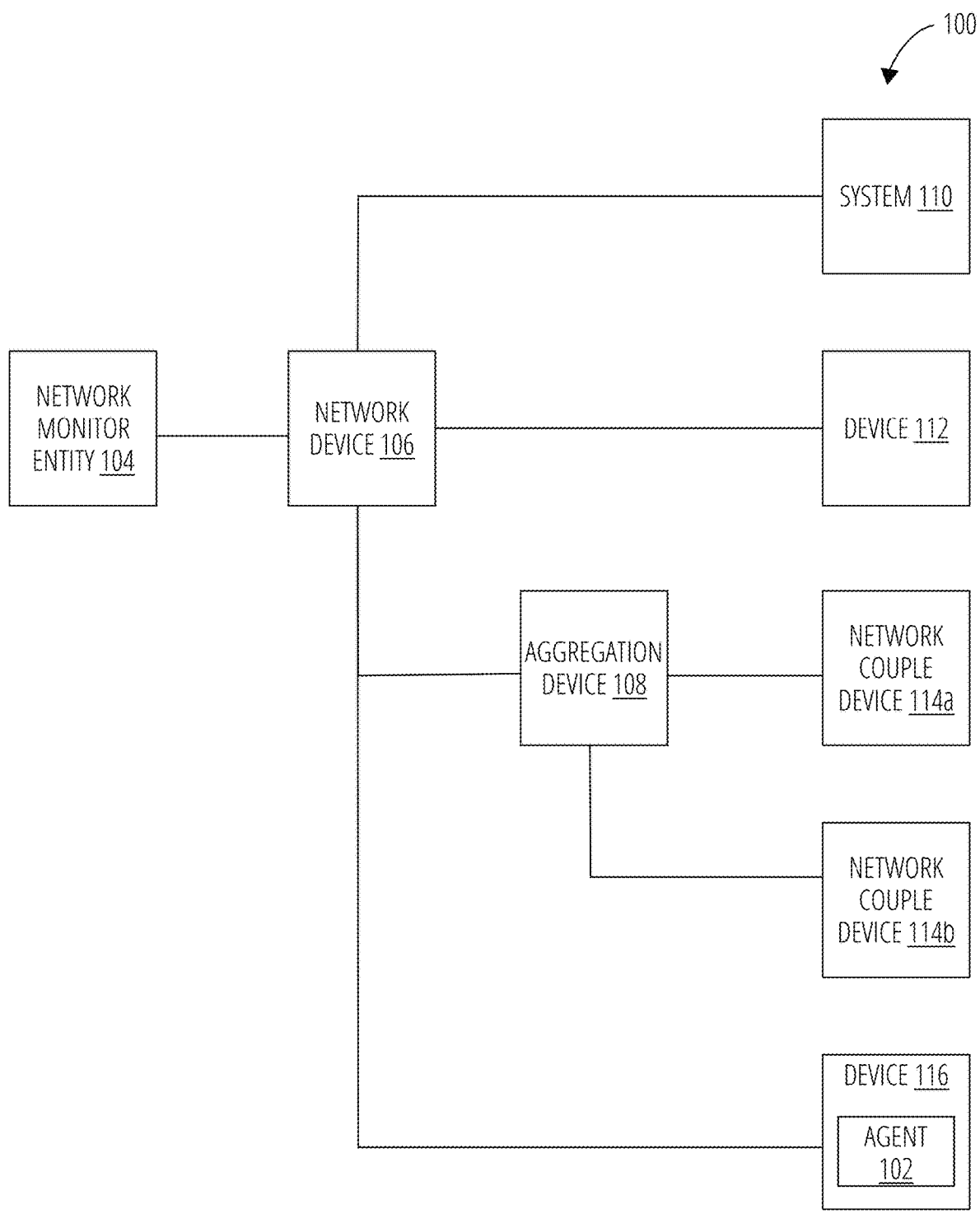
FIG. 1 depicts an example of a communication network, in accordance with an embodiment of the present disclosure.

Aspects and implementations of the present disclosure are directed to providing an enhanced analysis and response to TI data using AI technology. Aspects described may provide TI data analysis with improved accuracy and efficiency, and do so with a customizable, extensible, and modular system architecture.

An IoC is an observable computer or network characteristic or activity that indicates that a system (e.g., a computing device) is potentially infiltrated by bad actor. Examples of IoCs include network traffic anomalies, unusual sign-in attempts, privilege account irregularities, changes to system configurations (e.g., files or settings of a computing device), unexpected software installations or updates, irregular or numerous requests for the same file, unusual Domain Name Systems requests, abnormal network traffic volume, and other characteristics or activity. Such data provides cybersecurity analysts with crucial knowledge after there has been a breach of data or in security.

CVE is a collection of publicly known computer security flaws captured through respective CVE records. Each CVE record is supported by a reference system that structures how to identify a security threat with an identification number (e.g., a unique number assigned to each security flaw), a description of the security flaw, affected products, impact, vulnerability type, and at least one public reference. A computer server may maintain CVE records (e.g., a list of the flaws) and make them accessible for download over the computer network 206. This list helps security experts prioritize and address vulnerabilities, evaluate cybersecurity strategies and frameworks, identify the latest security breach trends, and update computer systems (e.g., replacing software, hardware, or network architecture) to address security flaws.

Large language models (LLMs) are a subset of artificial intelligence (AI) technology which are trained to recognize, translate, predict, or generate text or other content. An LLM is a computer performed process and algorithm that is trained with test data to recognize and interpret human language or other types of complex data. LLMs may be trained with text-based data such as that gathered from the internet or other sources. LLMs may use a type of machine learning referred to as deep learning to understand how characters, words, and sentences function together. Deep learning involves the probabilistic analysis of unstructured data, which enables the deep learning model to recognize distinctions and relationships between different input features, without human intervention. LLMs are then further trained via tuning. They are fine-tuned or prompt-tuned to the particular task, such as interpreting questions, generating responses, or translating text from one language to another, including generating computer code or a database query from natural language.

Under conventional systems, a human threat analyst may sift through various TI data to understand TI trends. The threat analyst typically relies on a combination of technical skill, critical thinking, and strategic insight, to protect a computing device or network against threats. Even armed with this experience and knowledge, a human threat analyst may not be capable to process the sheer amount of TI data (e.g., gigabytes or terabytes of data), or filter through various data sources to determine whether an IoC poses a threat. Automating information gathering and data analysis in a timely manner is desirable, however, conventional systems lack an automated approach to data gathering from various systems that can present TI data from potentially different data sources in a meaningful way. Further, conventional systems may lack an automated approach that dynamically adapts and improves analyzing a TI inquiry based on data gathered while processing the initial inquiry (e.g., a prompt). Further, conventional systems may lack modularity and extensibility to adapt or grow capabilities using different data sources.

Aspects of the present disclosure relate to an automated artificial intelligence (AI) threat engine that uses Large Language Models (LLMs) to perform threat intelligence tasks. The engine employs collaborative agents, each one specialized to perform a specific task and configured to share information to provide TI analysis with respect to a prompt.

The AI threat engine may receive a prompt that is associated with a potential security threat on a computer network. This prompt can be in the form of a natural language input string, e.g., 'Look up threat X'. The engine may apply a first large language model (LLM) to the natural language input string to identify which agent is best suited for handling the prompt, and generate a first instruction for that first agent (e.g., 'threat X', or a derivation of 'threat X'). The engine routes the first instruction to the first agent, and the first agent applies a second LLM in association with a first data source (e.g., a database, a folder, a web search engine, etc.) to obtain a first data that is associated with the potential security threat.

The first data may provide additional information about 'threat X' such as, for example, a threat actor, times associated with the threat, common vulnerabilities and exposures (CVEs) associated with 'threat X', a website, a domain, etc. The engine may apply a third LLM (e.g., a summarizing LLM) to this first data, to generate a data output that is associated with the potential security threat on the computer network. In addition, the engine may apply the first LLM to the first data generated from the first agent, and find a suitable second agent and suitable instruction for the second agent.

For example, if the first data indicates a 'threat actor A' is associated with 'threat X', then first LLM may generate an instruction of 'obtain information about threat actor A' and route this to a second agent that is configured to use another dedicated LLM to search a second data source to 'obtain information about threat actor A'. In such a manner, the engine may chain together instructions and outputs to and from its different agents in response to when the output of one agent indicates to seek additional information from another agent. In addition, the engine may use one agent to mine a structured data source (e.g., an SQL database or other database with an associated schema), and a second agent to mine an unstructured data source (e.g., searching files or web pages).

Such a system may analyze TI data associated with improved efficiency and accuracy. The nature of the collaborative agent architecture automates the process of correlating data and recognizes potential links between atomic indicators of compromise. Such a system provides improved data summarization of relevant data retrieved from a vast amount of data, which may be performed in mere seconds (e.g., under a minute). These quick results may improve the overall incident response process. Further, the hybrid approach of structured and unstructured knowledge base increases the reliability, reducing the risk of a machine learning induced hallucination. Such a system can also be communicatively coupled to other network devices to use the output TI analysis as an input for performing additional network measures such as, for example, isolation, segmentation, alerts, etc.

It can be appreciated that the described technologies are directed to and address specific technical challenges and longstanding deficiencies in multiple technical areas, including but not limited to network security, monitoring, and policy enforcement. It can be further appreciated that the described technologies provide specific, technical solutions to the referenced technical challenges and unmet needs in the referenced technical fields.

FIG. 1 depicts an illustrative communication network 100, in accordance with one implementation of the present disclosure. The communication network 100 includes a network monitor entity 104, a network device 106, an aggregation device 108, a system 110, devices 112 and 116, and network coupled devices 114a and 114b. The devices 112 and 116 and network coupled devices 114a and 114b may be any of a variety of devices including, but not limited to, computing systems, laptops, smartphones, servers, Internet of Things (IoT) or smart devices, supervisory control and data acquisition (SCADA) devices, operational technology (OT) devices, campus devices, data center devices, edge devices, etc. It is noted that the devices of communication network 100 may communicate in a variety of ways including wired and wireless connections and may use one or more of a variety of protocols.

Network device 106 may be one or more network devices configured to facilitate communication among aggregation device 108, system 110, network monitor entity 104, devices 112 and 116, and network coupled devices 114a and 114b. Network device 106 may be one or more network switches, access points, routers, firewalls, hubs, etc.

Network monitor entity 104 may be operable for a variety of tasks including determining data that is held on each of one or more devices on a network, determining a security risk of the device based at least on the data (e.g., whether or not the data is sensitive), and segmenting the network in response to if the security risk satisfies a threshold, such that accessibility to the offending device is reduced. In some embodiments, network monitor entity 104 can use local resources (e.g., processing, memory, data resources, or other resources), cloud resources, or a combination thereof for such an operation. In various embodiments, various libraries or an application programming interface (API) may be used to perform the operations of the network monitor entity 104.

Network monitor entity 104 can determine one or more enforcement points where the device is communicatively coupled to the network and thereby determine the one or more enforcement points closest to the device. For example, network monitor entity 104 may access information on a switch (e.g., a switch cache) to determine a port (e.g., physical port, wireless port, or virtual port) where a device with a particular Internet Protocol (IP) address or Medium Access Control (MAC) address or other identifier is communicatively coupled. Network monitor entity 102 may also access information from a wireless access point where the device is communicatively coupled. In some embodiments, network monitor entity 104 may poll information from a cloud service to determine where a device is communicatively coupled or connected to a network. In various embodiments, network monitor entity 104 may access syslog or Simple Network Management Protocol (SNMP) information from a device itself to determine where a device is communicatively coupled or connected to a network (e.g., without accessing information from a network device or enforcement point). Network monitor entity 104 supports applying access policies in situations where a device is communicatively coupled to a network with more than one connection (e.g., a wired connection and a wireless connection).

Based on the enforcement point, network monitor entity 104 may determine the one or more access rules to be assigned to the one or more enforcement points based on an access policy. In some embodiments, based on information about the one or more enforcement points closest to the device, network monitor entity 104 translates the access policy into one or more commands that will be used to configure the access rules on the one or more enforcement points. The closest enforcement point to a device can be enforcement point where the device is communicatively coupled. The enforcement point may be network device or network infrastructure device closest in proximity (e.g., physical proximity) to the device. The enforcement point comprises the port where the device is communicatively coupled to the network, and communication to and from the device is sent first through that port. In some embodiments, the port of the enforcement point is the last point of communication within network infrastructure before communication is sent to the device. In various embodiments, the closest enforcement point is where communication from the device is initially sent when communications are sent from the device (e.g., prior to communications with the network backbone or Internet backbone). For example, the closest enforcement to a device connected to a switch is the switch. As another example, the closest enforcement point to a device wirelessly communicatively coupled to a wireless access point is the wireless access point. In various embodiments, network monitor entity 104 may access the current configuration of the one or more enforcement points to determine the access rules (e.g., Access Control Lists—ACLs) that are to be applied to the one or more enforcement points, as described herein. In some embodiments, a device is communicatively coupled to a wireless controller via a wireless access point and the wireless controller or a switch is the closest enforcement point (e.g., based on the wireless controller or the switch being able to apply access rules, for instance ACLs, to communications of the device, for instance, in the case where the wireless access point is not able to or does not have the functionality to apply access rules). In various embodiments, a device is communicatively coupled to a layer 3 switch via a layer 2 switch and the layer 3 switch is the closest enforcement point (e.g., based on the layer 3 switch being able to apply access rules, for instance ACLs, to communications of the device, for instance, in the case where the layer 2 switch is not able to or does not have the functionality to apply access rules).

Network monitor entity 104 may then apply or assign the access rules to the one or more enforcement points closest to the device. Network monitor entity 104 may communicate the access rules via application programming interfaces (APIs), command line interface (CLI) commands, Web interface, simple network management protocol (SNMP) interface, etc. In some embodiments, network monitor entity 104 may verify that the one or more enforcement points have been properly or correctly configured based on the access rules.

Network monitor entity 104 may provide an interface (e.g., a graphical user interface (GUI)) for viewing, monitoring, and modifying classification or associated thresholds associated with one or more models. Network monitor entity 104 may further monitor network traffic over time to reclassify entities as new entities join the network, entities rejoin the network, and new models are made available.

Network monitor entity 104 may further perform a variety of operations including identification, classification, and taking one or more remediation actions (e.g., changing network access of a device, changing the virtual local area network (VLAN), sending an email, sending a short message service (SMS) message, etc.).

Network monitor entity 104 may also parse network traffic. For example, the network monitor entity 102 may parse (e.g., read, analyze, access, etc.) different protocol fields of the network traffic (e.g., packets, messages, frames, etc.). The network monitor entity 104 may provide the field values of the protocol fields (e.g., values of certain portions of network packets, messages, frames, etc.) to one or more different processing engines (e.g., rule engines, machine learning models, etc.) that may request the protocol fields, as discussed in more detail below. The network monitor entity 104 may include a parser and one or more processing engines, as described herein.

An enforcement point may be a router, firewall, switch, hypervisor, software-defined networking (SDN) controller, virtual firewall, or other network device or infrastructure that may have an ACL-like or rule-like policy or functionality to apply based on the port where a device is communicatively coupled thereto. Enforcements points may also be a next generation firewall (NGFW) and cloud infrastructure. A NGFW can be updated with an ACL-like policy regarding a device accessing the Internet. Cloud infrastructure (e.g., Amazon web services (AWS) security groups) can be updated to drop packets from the IP address of the device that have a destination outside the cloud. Embodiments are operable to configure enforcement points at the edge of a network where a device is communicatively coupled thereto thereby controlling access of the device on a customized basis (e.g., customized or tailored for the device).

In some embodiments, if the categorization or characteristics functionality is being updated (e.g., which could result in a change in one or more access rules that are assigned to an enforcement point closest a device and thus impact the enforcement of an access policy by the enforcement points), notifications may be sent (e.g., via email or other methods as described herein) or presented to a user (e.g., via a graphical user interface (GUI)) to indicate that the categorization or characteristics of one or more entities is changing and should be confirmed before one or more enforcement points are updated based on the changed categorization or characteristics. After conformation, the access rules may be changed.

Network monitor entity 104 may be a computing system, network device (e.g., router, firewall, an access point), network access control (NAC) device, intrusion prevention system (IPS), intrusion detection system (IDS), deception device, cloud-based device, virtual machine based system, etc. Network monitor entity 104 may be communicatively coupled to the network device 106 in such a way as to receive network traffic flowing through the network device 106 (e.g., port mirroring, sniffing, acting as a proxy, passive monitoring, etc.). In some embodiments, network monitor entity 104 may include one or more of the aforementioned devices. In various embodiments, network monitor entity 104 may further support high availability and disaster recovery (e.g., via one or more redundant devices).

In some embodiments, network monitor entity 102 may monitor a variety of protocols (e.g., Samba, hypertext transfer protocol (HTTP), secure shell (SSH), file transfer protocol (FTP), transfer control protocol/internet protocol (TCP/IP), user datagram protocol (UDP), Telnet, HTTP over secure sockets layer/transport layer security (SSL/TLS), server message block (SMB), point-to-point protocol (PPP), remote desktop protocol (RDP), windows management instrumentation (WMI), windows remote management (WinRM), etc.).

The monitoring of entities by network monitor entity 102 may be based on a combination of one or more pieces of information including traffic analysis, information from external or remote systems (e.g., system 110), communication (e.g., querying) with an aggregation device (e.g., aggregation device 106), and querying the device itself (e.g., via an application programming interface (API), command line interface (CLI), web interface, simple network management protocol (SNMP), etc.). Network monitor entity 104 may be operable to use one or more APIs to communicate with aggregation device 108, device 112, device 116, or system 110. Network monitor entity 104 may monitor for or scan for entities that are communicatively coupled to a network via a Network Address Translation (NAT) device (e.g., firewall, router, etc.) dynamically, periodically, or a combination thereof.

Information from one or more external or third party systems (e.g., system 110) may further be used for determining one or more tags or characteristics for a device. For example, a vulnerability assessment (VA) system may be queried to verify or check if a device is in compliance and provide that information to network monitor entity 104. External or third party systems may also be used to perform a scan or a check on a device to determine a software version.

Device 116 can include agent 102. The agent 102 may be a hardware component, software component, or some combination thereof configured to gather information associated with device 116 and send that information to network monitor entity 104. The information can include the operating system, version, patch level, firmware version, serial number, vendor (e.g., manufacturer), model, asset tag, software executing on a device (e.g., anti-virus software, malware detection software, office applications, web browser(s), communication applications, etc.), services that are active or configured on the device, ports that are open or that the device is configured to communicate with (e.g., associated with services running on the device), media access control (MAC) address, processor utilization, unique identifiers, computer name, account access activity, etc. The agent 102 may be configured to provide different levels and pieces of information based on device 116 and the information available to agent 102 from device 116. Agent 102 may be able to store logs of information associated with device 116. Network monitor entity 104 may utilize agent information from the agent 102. While network monitor entity 104 may be able to receive information from agent 102, installation or execution of agent 102 on many entities may not be possible, e.g., IoT or smart devices.

System 110 may be one or more external, remote, or third party systems (e.g., separate) from network monitor entity 104 and may have information about devices 112 and 116 and network coupled devices 114a and 114b. System 110 may include a vulnerability assessment (VA) system, a threat detection (TD) system, endpoint management system, a mobile device management (MDM) system, a firewall (FW) system, a switch system, an access point system, etc. Network monitor entity 104 may be configured to communicate with system 110 to obtain information about devices 112 and 116 and network coupled device 114a and network couple device 114b on a periodic basis, as described herein. For example, system 110 may be a vulnerability assessment system configured to determine if device 112 has a computer virus or other indicator of compromise (IOC).

The vulnerability assessment (VA) system may be configured to identify, quantify, and prioritize (e.g., rank) the vulnerabilities of a device. The VA system may be able to catalog assets and capabilities or resources of a device, assign a quantifiable value (or at least rank order) and importance to the resources, and identify the vulnerabilities or potential threats of each resource. The VA system may provide the aforementioned information for use by network monitor entity 102.

The advanced threat detection (ATD) or threat detection (TD) system may be configured to examine communications that other security controls have allowed to pass. The ATD system may provide information about a device including, but not limited to, source reputation, executable analysis, and threat-level protocols analysis. The ATD system may thus report if a suspicious file has been downloaded to a device being monitored by network monitor entity 102.

Endpoint management systems can include anti-virus systems (e.g., servers, cloud based systems, etc.), next-generation antivirus (NGAV) systems, endpoint detection and response (EDR) software or systems (e.g., software that record endpoint-system-level behaviors and events), compliance monitoring software (e.g., checking frequently for compliance).

The mobile device management (MDM) system may be configured for administration of mobile devices, e.g., smartphones, tablet computers, laptops, and desktop computers. The MDM system may provide information about mobile devices managed by MDM system including operating system, applications (e.g., running, present, or both), data, and configuration settings of the mobile devices and activity monitoring. The MDM system may be used get detailed mobile device information which can then be used for device monitoring (e.g., including device communications) by network monitor entity 104.

The firewall (FW) system may be configured to monitor and control incoming and outgoing network traffic (e.g., based on security rules). The FW system may provide information about a device being monitored including attempts to violate security rules (e.g., unpermitted account access across segments) and network traffic of the device being monitored.

The switch or access point (AP) system may be any of a variety of network devices (e.g., network device 106 or aggregation device 108) including a network switch or an access point, e.g., a wireless access point, or combination thereof that is configured to provide a device access to a network. For example, the switch or AP system may provide MAC address information, address resolution protocol (ARP) table information, device naming information, traffic data, etc., to network monitor entity 104 which may be used to monitor entities and control network access of one or more entities. The switch or AP system may have one or more interfaces for communicating with IoT or smart devices or other devices (e.g., ZigBee™, Bluetooth™, etc.), as described herein. The VA system, ATD system, and FW system may thus be accessed to get vulnerabilities, threats, and user information of a device being monitored in real-time which can then be used to determine a risk level of the device.

Aggregation device 108 may be configured to communicate with network coupled devices 114a and 114b and provide network access to network coupled devices 114a and 114b. Aggregation device 108 may further be configured to provide information (e.g., operating system, device software information, device software versions, device names, application present, running, or both, vulnerabilities, patch level, etc.) to network monitor entity 104 about the network coupled devices 114a and 114b. Aggregation device 108 may be a wireless access point that is configured to communicate with a wide variety of devices through multiple technology standards or protocols including, but not limited to, Bluetooth™, Wi-Fi™, ZigBee™ Radio-frequency identification (RFID), Light Fidelity (Li-Fi), Z-Wave, Thread, Long Term Evolution (LTE), Wi-Fi™ HaLow, HomePlug, Multimedia over Coax Alliance (MoCA), and Ethernet. For example, aggregation device 108 may be coupled to the network device 106 via an Ethernet connection and coupled to network coupled devices 114a and 114b via a wireless connection. Aggregation device 108 may be configured to communicate with network coupled devices 114a and 114b using a standard protocol with proprietary extensions or modifications.

Aggregation device 108 may further provide log information of activity and properties of network coupled devices 114a and 114b to network monitor entity 104. It is appreciated that log information may be particularly reliable for stable network environments (e.g., where the types of devices on the network do not change often). The log information may include information of updates of software of network coupled devices 114a and 114b.

Network segmentation can be used to enforce security policies on a network, for instance in large and medium organizations, by restricting portions or areas of a network which a device can access or communicate with. Segmentation or "zoning" can provide effective controls to limit movement across the network (e.g., by a hacker or malicious software). Enforcement points including firewalls, routers, switches, cloud infrastructure, or other network components or devices may be used to enforce segmentation on a network (and different address subnets may be used for each segment). Enforcement points may enforce segmentation by filtering or dropping packets according to the network segmentation policies/rules.

An entity or entities, as discussed herein, include devices (e.g., computer systems, for instance laptops, desktops, servers, mobile devices, IoT devices, OT devices, etc.), endpoints, virtual machines, services, serverless services (e.g., cloud based services), containers (e.g., user-space instances that work with an operating system featuring a kernel that allows the existence of multiple isolated user-space instances), cloud based storage, accounts, and users. Depending on the device, a device may have an IP address (e.g., a device) or may be without an IP address (e.g., a serverless service). Embodiments are able to dynamically (e.g., on the fly or responsive to changing conditions, for instance, a device being communicatively coupled to a network or in response to determination of characteristics of a device) control access of various entities or micro-segment various entities, as described herein.

The enforcement points may be one or more network devices (e.g., firewalls, routers, switches, virtual switch, hypervisor, SDN controller, virtual firewall, etc.) that are able to enforce access or other rules, ACLs, or the like to control (e.g., allow or deny) communication and network traffic (e.g., including dropping packets) between the device and one or more other entities communicatively coupled to a network. Access rules may control whether a device can communicate with other entities in a variety of ways including, but not limited to, blocking communications (e.g., dropping packets sent to one or more particular entities), allowing communication between particular entities (e.g., a desktop and a printer), allowing communication on particular ports, etc. It is appreciated that an enforcement point may be any device that is capable of filtering, controlling, restricting, or the like communication or access on a network. A segmentation policy or suggestion may include access rules that are determined to reduce a security risk of one or more devices on the network.

In an aspect, the network monitor entity 104 may handle natural language prompts to help identify potential security threats. Network monitor entity 104 may comprise a plurality of agents that use respective LLMs to mine and assess TI data, as described in other sections. Based on the final output, the network monitor entity 104 may present results to a threat analyst, or automatically perform a remedial measure (e.g., segmentation, etc.). In another aspect, an AI threat engine such as AI threat engine 226 may be communicatively coupled to network monitor entity 104 or integrated as part of network monitor entity 104.

Figure 2:
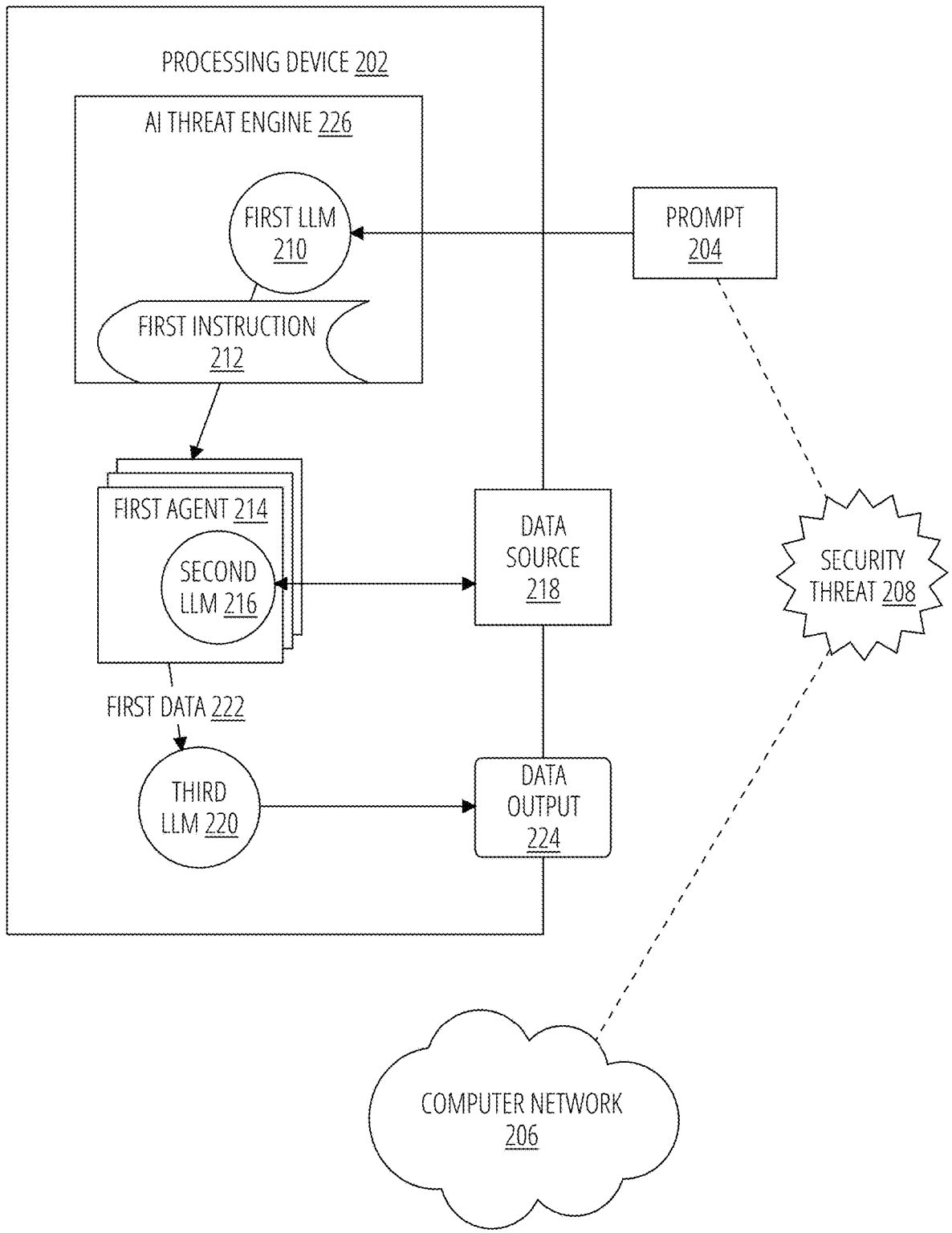
FIG. 2 depicts an illustrative computer network with an artificial intelligence (AI) threat engine, in accordance with an embodiment.

FIG. 2 depicts an illustrative computer network with an artificial intelligence (AI) threat engine 226, in accordance with an embodiment.

Computer network 206 may represent a single computer network, or it may represent numerous computer networks, which may be interconnected or isolated from each other. Computer network 206 may represent a local area network, a wide area network, or the internet. Computer network 206 may include one or more network devices such as network monitor entity 104, network device 106, network couple device 114a, 114b, aggregation device 108, and any of the network components described with respect to FIG. 1.

The computer network 206 may be coupled a processing device 202 which may comprise one or more network nodes. Processing device 202 may include one or more computer servers, IoT devices (e.g., a television, sensors, appliances, medical equipment, exercise equipment, or other IoT device), personal computers, databases, mobile phones, tablet computers, proprietary operational technology (OT), one or more entities, and more. Processing device 202 may host AI threat engine 226.

AI threat engine 226 may comprise a plurality of large language models (LLMs) that are each configured to perform dedicated operations within the AI threat engine 226. Each LLM may comprise a machine learning model that is configured through training to analyze a natural language input string. Machine learning is a subset of AI, and it refers to the practice of feeding a program large amounts of data in order to train the program how to identify features of that data without human intervention. Each LLM may comprise an artificial neural network (ANN) with layers of nodes (artificial neurons) that are interconnected to communicate a signal from one node to another. Generally, each ANN may comprise an input layer, an output layer, and one or more layers in between. Each connection between nodes may be weighted to emphasize or deemphasize a connection between nodes. The layers may only pass information to each other if their own outputs cross a threshold. Through training of a model (e.g., unsupervised learning, supervised learning, and/or reinforcement learning), training data is provided as input to a model and the weights are tuned (iteratively through back propagation) to produce a targeted output within a threshold margin of error. In an embodiment, each LLM may comprise a transformer model, which is a specific kind of neural network. A transformer model is a type of neural network architecture that transforms input sequences into output sequences, by learning relationships between components of a sequence and the context they provide. This improves how transformer models understand contextual relationships relative to other types of machine learning technology, and makes them more suitable for natural language processing (NLP).

Each LLM (e.g., first LLM 210, second LLM 216, and third LLM 220) may comprise an artificial neural network such as a transformer model. Some of the LLMs such as first LLM 210 and third LLM 220 may be general large language models, trained to perform general natural language tasks like summarization of input strings. Other LLMs such as second LLM 216 may be trained to perform more specific tasks, as described further herein.

Processing device receives a prompt 204. The prompt 204 may comprise a natural language input string associated with a potential security threat 208 on a computer network 206. For example, prompt 204 may comprise a natural language input string such as 'look up CVE-123'. The prompt may be received through an API call over the internet such as an HTTP request or the like. Additionally, or alternatively, the prompt 204 may receive through a graphical user interface. The prompt 204 may be generated by computer logic (e.g., a program), or it may be generated by a network administrator or cyber security threat analyst.

AI threat engine 226 may apply first LLM 210 to the natural language input string to generate a first instruction 212 that is associated with a first agent 214 that is to handle the first instruction. First LLM 210 is trained to identify a type of request in the prompt 204. For example, if the prompt includes a CVE name, First LLM 210 may identify this request as a CVE-based inquiry, generate a first instruction 212 (e.g., 'look up CVE-123'), and direct it to the suitable agent (e.g., first agent 214). As such, the first LLM 210 is trained to determine whether content in a prompt is relevant to a particular agent and data source pair, to generate the instruction from the prompt to that agent, and to route the instruction to that agent for handling.

The first agent 214 is to apply second LLM 216 in association with a data source 218 to obtain a first data 222. First data 222 is associated with the potential security threat 208. For example, assuming that the prompt 204 is "look up CVE-123", first LLM 210 may detect that prompt 204 relates an inquiry about a specified CVE, and correlate this to prompt to first agent 214 which is dedicated to look up CVEs in data source 218 (e.g., a CVE database). First LLM 210 generates an instruction such as 'look up CVE-123' which in this example is the same as the initial prompt 204, but in other examples, may be different or a subset of the initial prompt. In this example, the first agent 214 may apply 'CVE-123' as input to second LLM 216, which is trained to generate a corresponding database query to retrieve relevant data associated with 'CVE-123'. The second LLM 216 may be trained to translate the natural language input to the database query with respect to a structure of a database as defined by a database schema of the data source 218. For example, a schema may indicate the constraints such as table names, fields, data types and the relationships between these entities in the database. The second LLM 216 may be trained to convert the natural language inquiry into a query language such as structured query language (SQL), data query language (DQL), XQuery, or any other query language. The first agent 214 uses this database query as input to the data source 218 to extract first data 222 from data source 218. The data source 218 which may comprise a CVE database may be internally managed or a third party web server (e.g., a web page) that is accessible through the internet. The resulting first data 222 may comprise data relating to "CVE-123" such as a description of the security flaw, affected products, impact, vulnerability type, at least one public reference, etc.

In another example, if prompt 204 is to look up one or more questionable characteristics or behaviors such as 'network traffic increase to X packets per second', then the first LLM may generate the first instruction 212 as "X packets per second" and route this to the corresponding first agent 214 which may be dedicated to search the internet by using the corresponding data source 218 (e.g., a search engine) to collect relevant data. The first agent 214 may apply the first instruction 212 as input to the search engine, and the search engine may return the relevant web pages to "X packets per second". First agent 214 may apply second LLM 216 to the results, which in this case, is configured to scan the content of the web pages and summarize the findings in the resulting relevant web pages, such as for example "X packets per second may indicate a risk of compromise for device type X and Y, but is typical for device Z".

In another example, prompt 204 may comprise multiple components such as, for example, 'behavior X and filename Y are found on device type Z'. The first LLM 210 divide the prompt into a plurality of instructions that may comprise a single characteristic, or combinations of characteristics. For example, first LLM 210 may generate an instruction from the prompt 204 for 'behavior X' and another for 'filename Y' and another for 'behavior X and device type Z'.

First LLM 210 may be configured to route this instruction (which may contain a single component or multiple components) to the most suitable agent. In an example, multiple instructions may be generated for multiple agents but for the same prompt element. For example, first LLM 210 may generate a first instruction and route it to an agent to search web pages for 'X packets per second', and generate and route a second instruction 'X packets per second' to an IoC database. Each agent will generate respective data output 224 which will then be combined by third LLM 220 in the data output 224.

More generally, the first LLM 210 may identify a respective agent and data source pairing as being correlated to that instruction type generated based on the content of prompt 204. First agent 214 may be a plurality of agents, each configured to mine a different data source 218 while leveraging a respective LLM to help obtain the relevant data from the data source, as described further in other sections.

AI threat engine 226 may apply the third LLM 220 at least to the first data 222, to generate a data output 224 that is associated with the potential security threat 208 on the computer network. For example, referring back to the example of prompt 204 being 'look up CVE-123', assuming that first data 222 comprises data vulnerabilities 'Software A; Operating System B; Port M', the third LLM 220 may process first data 222 as input, and generate and output summary of 'CVE-123 indicates that devices with software A or operating system B or port M being open are vulnerable and risk may be reduced by updating to software AI or installing patch B1. Port M should be closed.'

Figure 3:
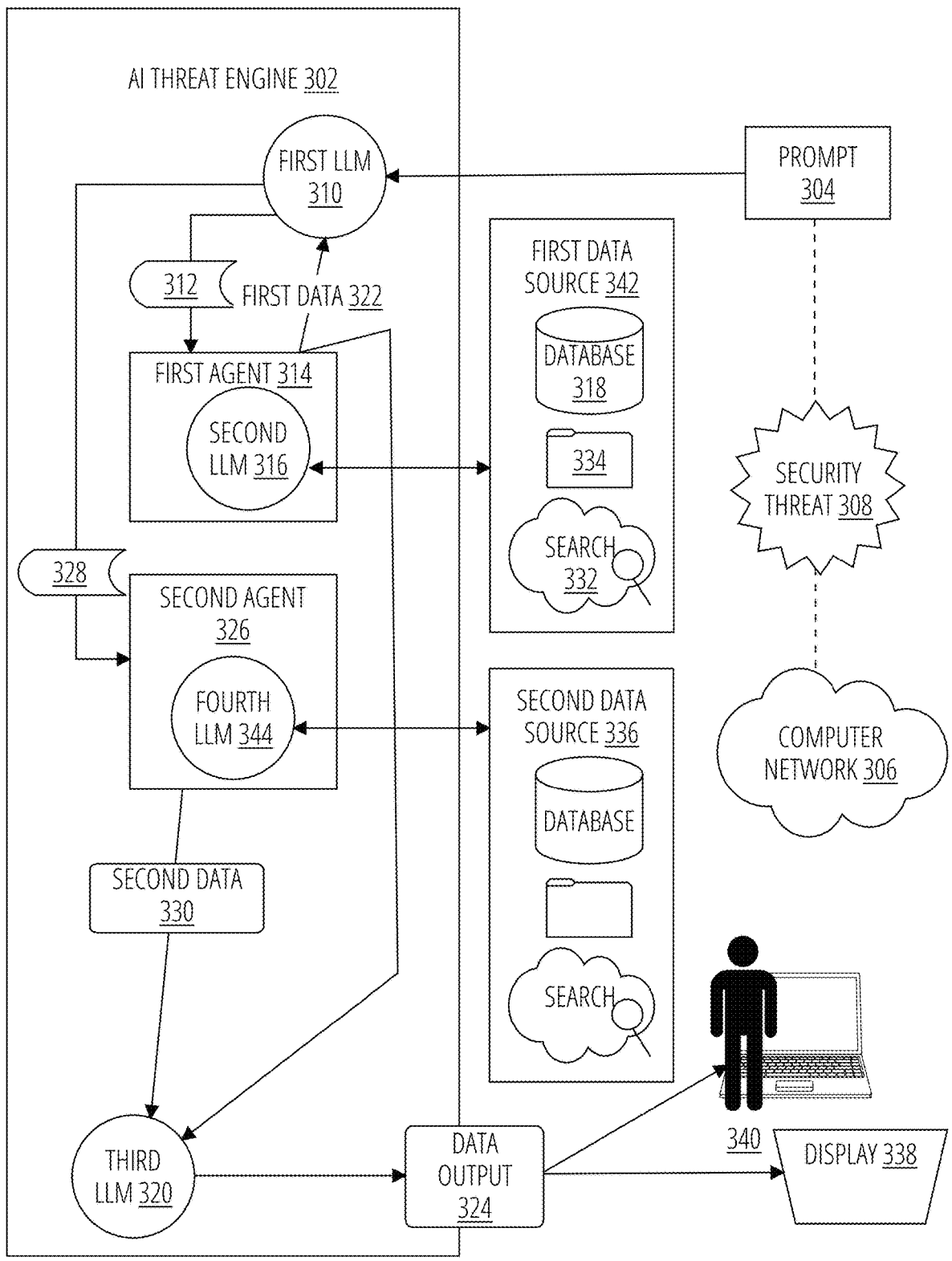
FIG. 3 shows an example of an AI threat engine comprising multiple agents, in accordance with an embodiment

FIG. 3 shows an example of an AI threat engine 302 comprising multiple agents, in accordance with an embodiment. Although shown as two, it should be understood that AI threat engine 302 can comprise two or more agents, each comprising or communicating with respective LLMs to mine a particular data source. General aspects described in other sections also apply to AI threat engine 302, such as those described with respect to AI threat engine 226, system 400, and method 500.

AI threat engine 302 may handle a prompt 304 which may comprise a natural language input string associated with a potential security threat 308 on a computer network 306. The potential security threat may comprise a threat indicator such as a potential ToC, a CVE, a domain name, an IP address, or other potential TI data or combination thereof.

AI threat engine 226 may apply first LLM 310 directly to the prompt 304, to generate a first instruction 312 that is associated with a first agent 314 that is to handle the first instruction 312. As described, first LLM 310 is trained to recognize which of its plurality of agents (e.g., first agent 314, second agent 326, etc.) is most suitable to handle the first instruction 312, for example, based on being trained to identify which associated data source is most likely to store data relevant to the content of prompt 304, or to identify which data source is most likely to yield a most relevant final data output 324 based on the prompt 304.

AI threat engine 302 may route the first instruction 312 to the first agent 314, wherein the first agent 314 is to apply a second LLM 316 in association with a first data source 342 to obtain a first data 322 that is associated with the potential security threat. The application of second LLM 316 may differ depending on the type of data source 342 that first agent 314 is to extract data from. For example, in the case that the first data source 342 is a structured database 318, second LLM 316 may be trained to generate a database query (that is non-natural language) based on translating the first instruction 312 to a database query. In this example, the first agent 314 can extract relevant data from the database 318 using a database query. Database 318 may be a locally accessible database (e.g., from a server on LAN or WAN), or an internet-based database (e.g., an online CEV or IoC database).

In another example, the first data source 342 may comprise a collection of files 334 (e.g., e.g., spreadsheets, emails, text documents, images, etc.)) which may be stored in a designated memory (e.g., a folder in an electronic file system). The first agent 314 may apply the second LLM 316 to search the folder for data relevant to instruction 312. The folder 334 may be populated and organized with a Retrieval-Augmented Generation (RAG) technique which improves integration of the data within the folder and the second LLM 316, for the second LLM 316 to more efficiently retrieve second data 330 that is relevant to first instruction 312 in folder 334.

In another example, the first data source 342 comprises a search engine 332. In such a case, the first agent 314 may apply the first instruction 312 and input to the search engine 332, and use second LLM 316 to scan the resulting relevant web pages returned from the search engine 332. In an example, the second LLM 316 may determine whether the relevant web pages indicate that the potential security threat 308 is an actual threat, or obtain additional information about the potential security threat 308 such as a threat actor associated with the security threat 308, a domain name, an IP address, common vulnerabilities, etc., to determine first data 322.

More generally, first LLM 310 can analyze the content of the prompt 304 and route instruction 312 to a corresponding agent and data source pair. In addition, AI threat engine 302 can generate a chain of instructions such that the output from one agent (e.g., first data 322) is used to generate a second instruction 328 for a second agent 326.

For example, the AI threat engine 302 may generate based on the first data 322, a second instruction 328 that is associated with a second agent 326 that is to handle the second instruction 328. The AI threat engine 302 may route the first data 322 to determine if an additional instruction can be generated based on the first data 322. Assuming that prompt 304 comprises 'look up CVE-123', first data 322 may comprise data such as a 'threat actor A', one or more vulnerabilities (e.g., software or versions thereof, operating systems or versions thereof, open ports, hardware components, etc.),'filename Z', or other data pulled in relation to 'CVE-123'. First LLM 310 may receive this as input and generate a second instruction 328 that comprises 'threat actor A'. AI threat engine 302 may route this second instruction 328 to second agent 326. The second agent 326 applies a fourth LLM 344 in association with a second data source 328. The second data source 336 can also comprise a database, a folder containing one or more files, or a search engine. In an embodiment, the second data source 336 is different from the first data source 342. The second agent 326 obtains second data 330 associated with the potential security threat 308, with help from the fourth LLM 344. As described, use of the fourth LLM 344 depends on the type of data source of second data source 336, and may be used to summarize web page results, or summarize relevant data in files of the folder, or to generate a database query based on the natural language instruction input 328.

AI threat engine 302 may apply the third LLM 320 at least to the first data 322 and to the second data 330 to generate the data output 324 that is associated with the potential security threat 308. This data output 324 is generated based on a combination of the first data 322 and the second data 330. In an example, third LLM 320 comprises a general LLM that summarizes the combined data. In another example, third LLM 320 is specifically trained to identify correlations between first data 322 and second data 330, and generate the summary which includes relationships between the first data and second data as well as a general summary. For example, if first data comprises "Threat actor A, vulnerability X" and second data indicates "vulnerability X is no longer a threat to Threat actor A after patch Z" then the data output 324 may indicate "CVE-123 is associated with Threat actor A, and vulnerability X, however, this risk may be reduced once patch Z is implemented".

The data output 324 may be presented to a display 338 such as through a graphical user interface (GUI) of a cyber threat analysis tool, or as an email or other text-based notification or alert. Additionally, or alternatively, data output 324 may be transmitted to a second device 340 which may be operated by a human (e.g., a cyber threat analyst) or automated (e.g., an application). In an embodiment, the second device 340 may perform a remedial action in response to the data output 324, such as performing network segmentation, modifying a firewall, isolating a device that is deemed to be compromised, etc. The remedial response may be performed automatically, manually, or a combination thereof.

In an embodiment, first data source 342 comprises a structured data source (e.g., a structured database), and second data source 336 comprises an unstructured data source (e.g., a search engine, a folder), or vice versa. In such a manner, the AI threat engine 302 may efficiently extract data from a wide variety of data sources that may be from structured databases, or from unstructured sources, while also reducing the risk of potential hallucinations from untrustworthy or imbalanced data. In an embodiment, the first LLM 310 is trained to determine which agent and corresponding data source is to be used, by analyzing the content of prompt 304, to most likely or most quickly to yield relevant data output 324. For example, if the prompt 304 mentions an identified CVE, first LLM 310 may select the first agent 314 corresponding to a first data source 342 which is private managed CVE database, to route the first instruction 312 to. Based on the result (e.g., first data 322), as described, additional agents can be used to mine additional data sources corresponding to each subsequent result. Although shown as two, any number of agents can be used to mine respective different data sources.

In an embodiment, the same agent may be reused again for the same prompt 304. For example, assuming that the first agent 314 obtains first data 322 comprising a vulnerability associated with an IoC, and the second agent 326 is used to obtain additional information the vulnerability which appear to be a risk in the presence of additional IoCs, the AI threat engine 302 may generate an additional instruction associated with the additional IoCs and route it to the first agent 314 to obtain additional data about the additional IoCs. The third LLM 320 may in such a case, summarize the combined data.

AI threat engine 302 and AI threat engine 226 may comprise additional architectural components, such as an orchestration architecture. In an embodiment, the first LLM 310 is wrapped in an agent (e.g., an orchestrator agent), and the third LLM 320 is wrapped in another agent (e.g., a response agent). Each of the first agent 314, the second agent 326, or additional agent/data source pairs may be referred to as toolset agents. Each toolset agent may communicate to the orchestrator agent through a common interface, thus providing a modular architecture in which new agents and data sources may be deployed, and different deployments of AI threat engine 302 may comprise different sets of agent/data source pairs, while using the same code base for AI threat engine 302. An example is shown in FIG. 4.

Figure 4:
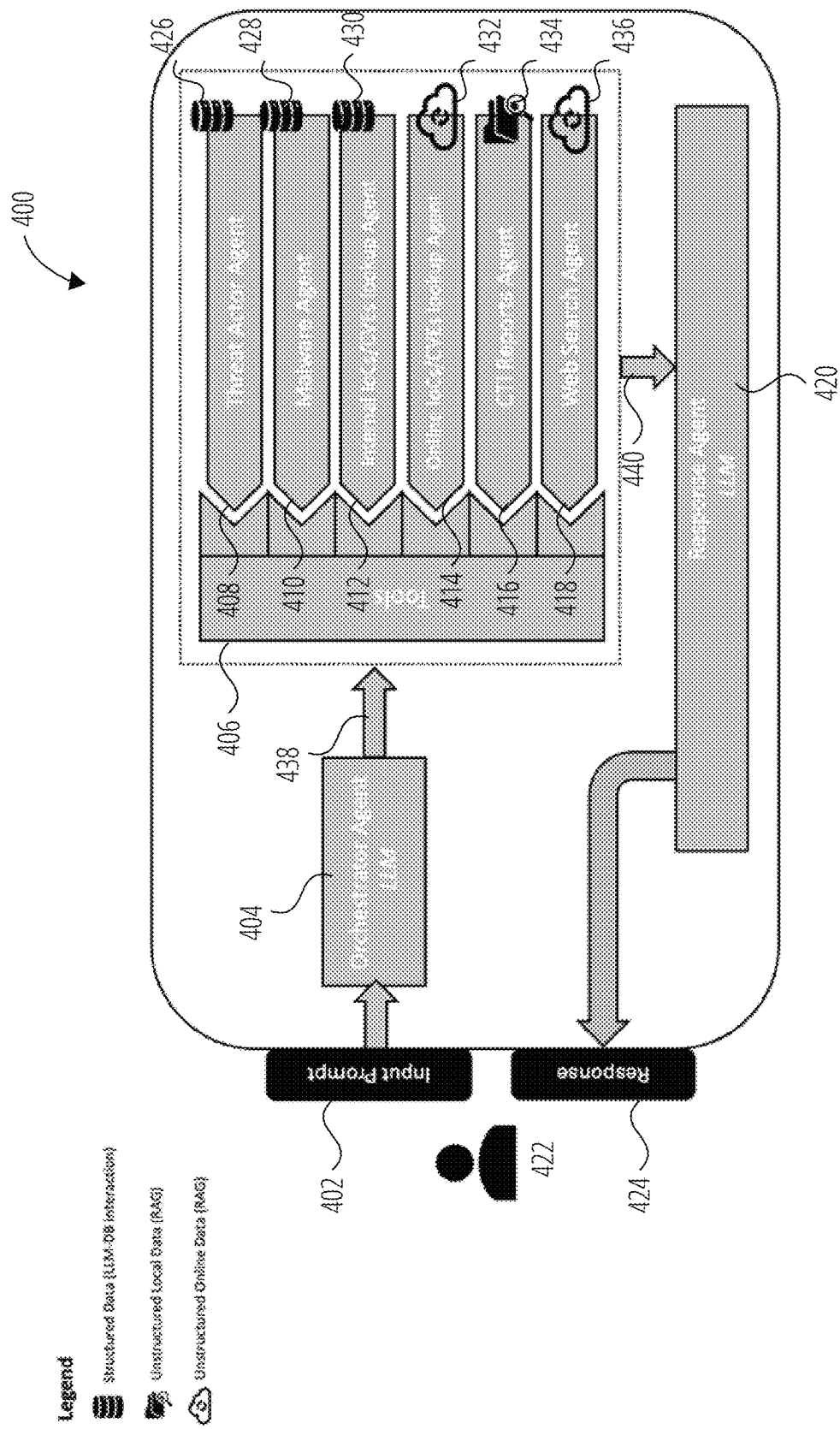
FIG. 4 shows an overview of a system to perform AI-based data processing for cyber threats, in accordance with an embodiment

FIG. 4 shows an overview of a system 400 to perform AI-based data processing for cyber threats, in accordance with an embodiment. System 400 may correspond to an AI threat engine such as those described in other sections.

Generally, the system 400 may comprise an orchestrator agent 404 to receive and handle an input prompt input prompt 402. The input prompt input prompt 402 may comprise a natural language string associated with a potential security threat, as described.

The orchestrator agent 404 defines the steps in the form of an instruction set, to help provide a relevant response 424 to the input prompt 402. The orchestrator agent 404 processes the input prompt 402 with a dedicated large language model, to identify which tool agent or agents is suitable to use for a given prompt, as well as the input instruction 438 for each of the identified tools, and interactions between them. The orchestrator agent 404 leverages an LLM to extrapolate the meaning and the context of the input prompt input prompt 402. The orchestrator agent 404 processes the input prompt 402 with the LLM to create the instruction set comprising chain of tasks, according to the available tools.

In an embodiment, the input prompt 402 is received from a user 422 which may be a person providing the input prompt input prompt 402 through a graphical user interface. In another example, input prompt 402 may be received from a client device that is connected to the system 400 over a computer network, as described in other sections. The orchestrator agent 404 may obtain the user prompt as natural language (e.g., 'Give me threat of a device type A having filetype B or filename C and software version D located on network segment E').

Orchestrator agent 404 comprises logic that routes data to and from a general LLM to respective one of toolset of agents such as, for example, threat actor agent 408, malware agent 410, internal IoC and CVE lookup agent 412, online IoC and CVE lookup agent 414, CTI reports agent 416, and web search agent 418). The general LLM of the orchestrator agent 404 is to generate one or more instructions 438 and route each instruction to a respective agent, either sequentially or in parallel, or both.

Each of the toolset agents may be configured to receive a respective instruction 438, and use a respective LLM or other machine learning model to extract data from the respective data source (e.g., database 426, database 428, database 430, an online database 432, collected files 432, or a web pages 436).

System 400 comprises response agent 420 that generates a response 424 which is generated based on output data 440. Output data 440 comprises the mined data contributed from each toolset agents such as threat actor agent 408, malware agent 410, internal IoC and CVE lookup agent 412, online IoC and CVE lookup agent 414, CTI reports agent 416, and/or web search agent 418. Depending on the input prompt 402, one, some, or all of the toolset agents may make a contribution. Each agent comprises independently operating processing logic dedicated to performing specific operations, and integrates respective large language models into the broader system 400.

The toolset agents such as threat actor agent 408, malware agent 410, internal IoC and CVE lookup agent 412, online IoC and CVE lookup agent 414, CTI reports agent 416, and web search agent 418 may each be respective microservices in a microservices application. Each toolset agent may interface with tools 406 which allows the different agents to be treated as a microservice with a common protocol. In this way, each agent may be plugged into the system 400 in a standardized manner. The orchestrator agent 404 and/or the response agent 420 may interface with a specific REST endpoint to access the targeted agent functionalities such as providing the instructions 438 as input and obtaining the output data 440.

With such an architecture, the system gains the ability to correlate threat intelligence information from different types of data sources, each handled by a respective agent. System 400 may comprise agents for accessing structured data (e.g., a database with defined schema) and unstructured data (e.g., files, PDFs, webpages, etc.).

The tools 406 form an abstraction layer that standardizes the interface with the agents 408, 410, 412, 414, 416, and 418, thereby ensuring consistent entry points, modularity, and portability. The tools 406 may comprise complementary API calls, processing logic, protocol translation and enforcement, to communicate with each microservice. Tools 406 may comprise logic communication channels (e.g., a command queue and response queue) between the orchestrator agent 404 and each of the toolset agents 408, 410, 412, 414, 416, and 418. The toolset agents are each configured to work with respective LLMs to extract potential threats from a dedicated data domain which that toolset agent is regarded as the expert, as described below.

Threat actor agent 408 retrieves specific information from a threat actor database 426. This information may include threat actor aliases, tactics, techniques and procedures, origin of the threat actor, target countries, tools, malware and known exploited vulnerability. Threat actor agent 408 may comprise or access an LLM module that is configured to translate natural language requests (e.g., an input instruction 438) into specific database queries for the database 426.

Malware agent 410 is similar to the threat actor agent 408. Malware agent 410 has access to a malware database 428 that contains relevant information of malware samples, such as a malware family, malware variants, and IoCs. The malware agent 410 may comprise or access an LLM module that is also configured to translate natural language requests (e.g., an input instruction 438) into specific database queries for malware database 428.

Internal IoCs/CVEs Lookup Agent 412 is similar to threat actor agent 408 and malware agent 410. internal IoC and CVE lookup agent 412 has access to an IoC database 430 that contains relevant information to recent IoCs such as, for example, IPv4/IPv6 addresses, domain names, URLs, and file hashes that are associated with recent IoCs. The database 430 may contain information about CVEs that are Known to be Exploited (KEV) on the internet. Every IoC may comprise additional contextual data such as, for example, sighting data (e.g., time and other data associated with a first occurrence and/or last occurrence), associated tactic or technique, Autonomous System Number (ASN), geographical information, or a combination thereof. The internal IoC and CVE lookup agent 412 may comprise or access an LLM module to translate natural language requests (e.g., input instruction 428) into specific database queries for the database 430.

Online IoCs/CVEs Lookup Agent 414 is similar to internal IoC and CVE lookup agent 412, however, rather than access an intern or locally maintained database, online IoC and CVE lookup agent 414 may obtain data about IoCs and CVEs from third-party online resources 432 to perform lookup requests. Third-party online resources may comprise one or more databases, web-service, web page, or other online resource. The online IoC and CVE lookup agent 414 may comprise or access an LLM module that translates a natural language request (e.g., input instruction 428) into a specific database query or API call or both, which may be transmitted to online resource 432 as a request. Threat actor agent 408, internal IoC and CVE lookup agent 412, malware agent 410, and online IoC and CVE lookup agent 414 may interact with structured databases, and each LLM module leveraged by the respective agent may be trained to generate a database query in corresponding query language and in view of the structure of the database (e.g., as defined by a schema of the database).

CTI Reports Agent 416 has access to a collection of files 434 that contains selected Cyber Threat Intelligence (CTI) reports about incidents, investigations, and research. The CTI reports agent 416 may employ a Retrieval Augmented Generation (RAG) system with an underlying LLM module that is configured to retrieve the data that is relevant to a corresponding input instruction 438, contained in those documents. The CTI reports may be automatically or manually selected and placed in a dedicated location of an electronic file system (e.g., a folder), based on predefined one or more conditions. Selection and storage of the CTI reports improves reliability and focus of the resulting retrieved data.

Web Search Agent 418 is similar to the CTI Report Agent in that it may performed an unstructured search of data to find data that is relevant to corresponding input instruction 438. Web search agent 418, however, has access to a larger set of data (e.g., web resources 436) to retrieve information. In an embodiment, web resources 436 may comprise a limited list of internet resources 436 (e.g., web pages) available on the internet that are deemed to be reliable, credible, accurate, or a combination thereof. The web search agent 418 may use a search engine to search these web pages for data that relevant to corresponding input instruction 438, and apply an LLM (e.g., a RAG system) to sort and summarize the findings. The web search agent 418 and CTI reports agent 416 may use respective LLMs to extract the relevant data from the unstructured data and convert the relevant data to a natural language description of the relevant data. Such an approach allows the web search agent 418 to get access to the latest TI information while bypassing retraining of an underlying machine learning model. Further, by searching web pages, this allows the model to get access to the latest information bypassing retraining.

Response agent 420 may comprise or access an LLM to process the respective output data 440 from each of the toolset agents, and generate a response 424 which may correspond to data output 224 or data output 324 as described in other sections. This LLM may be trained to generate the response 424 as a natural language summary that combines the respective output data 440 from each of the toolset agents.

In an embodiment, each LLM that is used by the orchestrator agent 404, the response agent 420 may comprise a general LLM such as, for example, ChatGPT (e.g., GPT-3.5, GPT-4, or variation thereof). Each of the toolset agents that mine data from structured data sources (e.g., threat actor agent 408, malware agent 410, internal IoC and CVE lookup agent 412, and/or online IoC and CVE lookup agent 414) may access a specialized LLM that is trained to convert instructions to a specific database query. The LLMs used for mining unstructured data sources 434, 436 may be integral to a RAG-based system.

In an embodiment, the orchestrator agent 404 may generate one or more input instructions 438 for each toolset agent that is deemed to be relevant to a given input prompt 402. Further, the orchestrator agent 404 may dynamically generate or modify the input instructions 438, by changing or generating a new instruction for a second toolset agent, according to an output of a first agent. By doing so, orchestrator agent 404 recognizes correlations between different agents and different data sources, and uses those correlations to provide improved input to a downstream agent, which ultimately provides a more accurate response 424 to input prompt 402.

For example, a user 422 may provide an input prompt 402 that request information about 'CVE-XXX'. In response, orchestrator agent 404 may generate the input instruction 438 of 'look into information about CVE-XXX' and route this to internal IoC and CVE lookup agent 412. The internal IoC and CVE lookup agent 412 may use an LLM to convert this to a structured database query to extract relevant data for CVE-XXX from database 426 and return this as data output 440.

If internal IoC and CVE lookup agent 412 returns an empty output or otherwise indicates absence of relevant data, orchestrator agent 404 may generate a second input instruction 438 'look into information about CVE-XXX online' and route this to online IoC and CVE lookup agent 414.

The orchestrator agent 404 may generate and route the instruction 'look for TA employing CVE-XXX' to threat actor agent 408. Additionally, 404 may generate and route the instruction 'look for CTI reports containing CVE-XXX' to CTI reports agent 416. If, for example, the CTI reports agent 416 returns data output 440 that indicates CVE-XXX is linked to an IP address of 'IP x.y.z.w' and a threat actor 'TA1', the orchestrator agent 404 may generate another instruction 438 as 'look for TA1 information' and route this instruction to threat actor agent 408. Orchestrator agent 404 may also generate another instruction 438 as 'look for info about IP x.y.z.w'. Similarly, orchestrator agent 404 may generate an instruction 438 as 'look for recent news about CVE-XXX, and IP x.y.z.w, and TA1' and route it to web search agent 418. Each toolset agent generates respective output data 440 by mining the respective data source based on the instruction 438.

Response agent 420 applies an LLM to process and combine the output data 440 to provide a response 424, such as, for example, 'CVE-XXX was found to be linked to IP x.y.z.w and TA1, whereby possible vulnerabilities include V1, V2, V3. The first occurrence of CVE-XXX was Date-Time1, and the last occurrence of CVE-XXX was DateTime2.'

Figure 5:
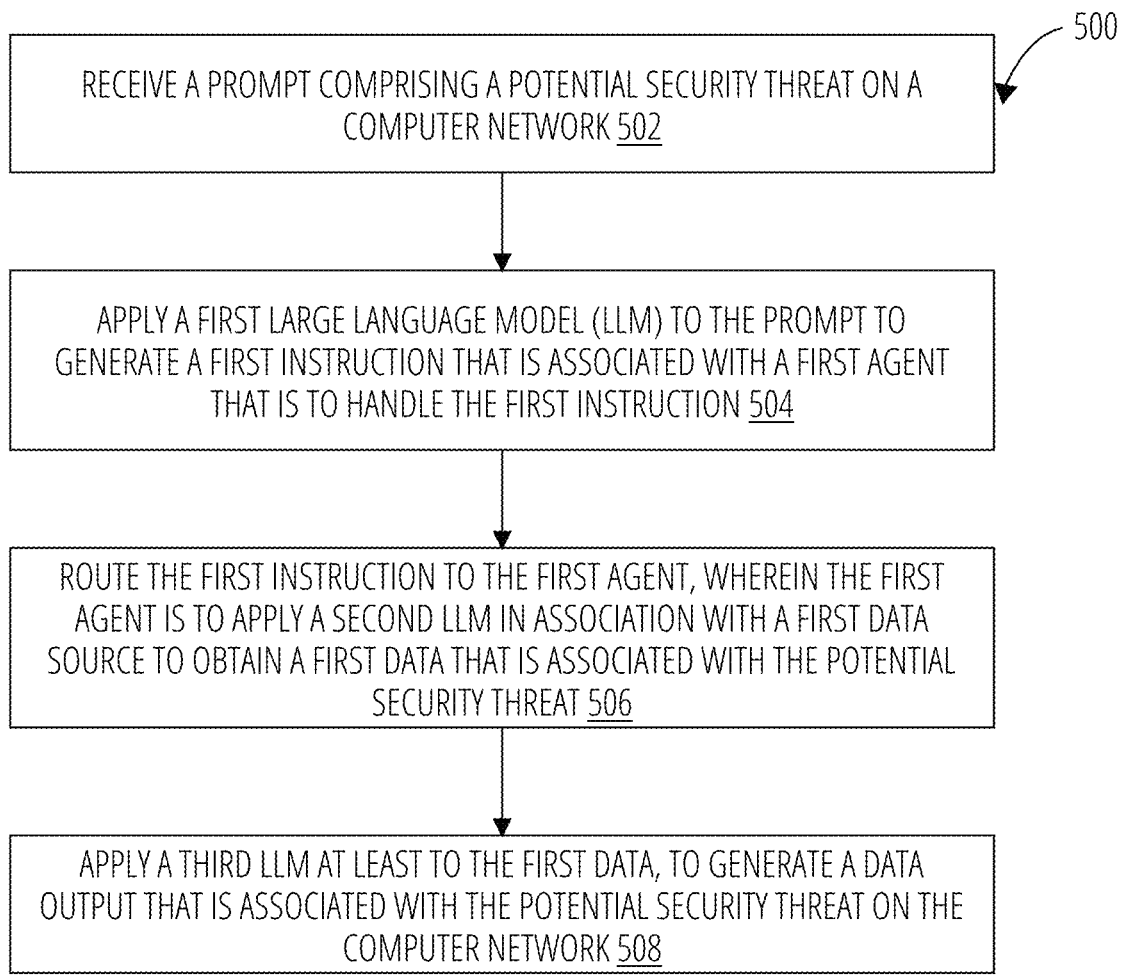
FIG. 5 illustrates an example method for an artificial intelligence based cyber-threat processing, in accordance with an embodiment

FIG. 5 illustrates an example method 500 for an artificial intelligence based cyber-threat processing, in accordance with an embodiment. Although the example method 500 depicts a particular sequence of operations, the sequence may be altered without departing from the scope of the present disclosure.

Method 500 may be performed by processing logic which may be integral to one or more processing devices. Processing logic may comprise hardware (e.g., circuitry, dedicated logic, programmable logic, a processor, a processing device, a central processing unit (CPU), a system-on-chip (SoC), a transmitter, a receiver, etc.), software (e.g., instructions stored in memory executed by a processing device), firmware (e.g., microcode), or a combination thereof.

At block 502, processing logic receives a prompt comprising a potential security threat on a computer network. The prompt may comprise a natural language input string associated with the potential security threat, such as, for example, an IoC, a CVE, or other inquiry involving TI data.

At block 504, processing logic applies a first large language model (LLM) to the natural language input string to generate a first instruction that is associated with a first agent that is to handle the first instruction.

At block 506, processing logic routes the first instruction to the first agent, wherein the first agent is to apply a second LLM in association with a first data source to obtain a first data that is associated with the potential security threat.

At block 508, processing logic applies a third LLM at least to the first data, to generate a data output that is associated with the potential security threat on the computer network.

In an embodiment, to apply the second LLM comprises to apply the second LLM to the first instruction to generate a database query, and to query the first data source which is a structured database with the database query to obtain the first data. The database may store data associated with threat actors, IoCs, CVEs, or a combination thereof. The database may be locally accessible (e.g., in a LAN) or over the internet.

In an embodiment, to apply the second LLM comprises to search a collection of files (e.g., documents in a dedicated folder) based on the first instruction to obtain a relevant document, and to apply the second LLM to the relevant document to obtain the first data. For example, the second LLM may be configured to find relevant documents extract relevant data in those documents in the folder. The second LLM may use a retrieval augmented generation framework to enhance the extraction of relevant data. RAGs operate with search algorithms to query external data, such as web pages, knowledge bases, and databases. Once retrieved, the relevant information undergoes pre-processing, such as, for example, tokenization, stemming, and removal of stop words. The pre-processed retrieved information is integrated into the trained LLM. This integration enhances the LLM's contextual analysis, providing the LLM with an understanding of the files based on context. The LLM can generate more precise responses based on this understanding. RAG operates by first retrieving relevant information from a data source using a query generated by the LLM. This retrieved information is then integrated into the LLM's query input, enabling it to generate more accurate and contextually relevant text. RAG may leverage vector databases to store data for efficient search and retrieval.

In an embodiment, to apply the second LLM comprises to transmit a request comprising the first instruction (e.g., "look for CVE-XXX online") to an internet search engine to obtain relevant web pages, and to apply the second LLM to the relevant web pages to obtain the first data. The first data may comprise a natural language summary of data relevant to CVE-XXX on web pages returned by the search engine.

In an embodiment, method 500 further comprises generating (or modifying), by processing logic, based on the first data, a second instruction that is associated with a second agent that is to handle the second instruction, and routing the second instruction to the second agent. The second agent is to apply a fourth LLM in association with a second data source that is different from the first data source, to obtain a second data associated with the potential security threat. For example, the first agent may be configured to search a threat actor database, while a second agent may be configured to search a dedicated folder. The third LLM is applied at least to the first data and to the second data to generate the data output associated with the potential security threat on the computer network that summarizes the potential security threat based on a combination of the first data and the second data. This dynamic generation of instructions improves the accuracy of the final result by using information gained from one data source to better search for information in the same or a different data source.

In an embodiment, the first data source is a structured data source and the second LLM generates a query for the structured data source to obtain the first data, and the second data source is an unstructured data source and the fourth LLM analyzes search results of the unstructured data source to obtain the second data. Alternatively, the first data source is the unstructured data source and the second LLM analyzes search results of the unstructured data source to obtain the second data, and the second data source is the structured data source and the fourth LLM generates the query for the structured data source to obtain the first data. In such a manner, the method may mine both structured and unstructured data sources for data that is relevant to the prompt, improving the balance of data, and reducing the risk of hallucinations.

In an embodiment, each of the first agent and the second agent is a microservice comprising a Representational State Transfer (REST) endpoint. Each agent is coupled to a common interface through the respective REST endpoint to receive a respective instruction from the first LLM. In such a manner, processing logic may comprise a modular and extensible architecture to grow or shrink the data sources to suit different applications while using the same underlying code base for different deployments.

In an embodiment, processing logic may present the data output to a display. This may be presented through a custom graphic user interface of a dedicated network tool, or through a text alert or email, or a combination thereof.

In an embodiment, processing logic may transmit the data output to a second computing device associated with transmission of the prompt. For example, the prompt may be received by a human or software module operating a second computing device over a computer network. Processing logic may transmit the data output to the second computing device.

In an embodiment, the first LLM may be associated with an orchestrator agent as described in other sections. The first LLM may be trained to generate the instruction set to comprise a plurality of instructions, each associated with a respective agent (e.g., two or more agents) for a respective one of the plurality of natural language outputs to be routed to. After receiving each output from each respective agent, the first LLM is applied to the output to determine whether the output includes data to enhance any of the instructions. In response to determining that the output includes data that is associated with one of the data sources, processing logic may generate an instruction for that data source and route the dynamically generated instruction to the relevant agent. For example, if the first agent provides first data of 'CVE-XXX is linked to IP w.x.y.z', then the first LLM may generate a new instruction, or modify an existing instruction, such as 'look up IP W.X.Y.Z online in association with a CVE-XXX', and route this to a second agent.

In an embodiment, processing logic may use one or more number of toolset agents, each with a dedicated data source, until a threshold number of agents is satisfied, or until the combined data output is satisfied (e.g., a threshold combination of agents provide a non-empty response), or a combination thereof. Processing logic may route the output data to the third LLM (e.g., managed by a response agent) when the threshold is satisfied. For example, referring to FIG. 4, rather than routing instructions to each and every toolset agent, once a threshold number of agents contributed to output data 440, the system 400 may process this output data 440 and cease processing by additional toolset agents, thereby reducing excessive use of compute resources.

In an embodiment, processing logic may store the data output in memory and use the stored data output in combination with a second prompt. For example, in response to receiving a subsequent prompt that comprises 'tell me about threat actor TA1 and CVE-XXX', processing logic may combine the stored data output relevant to 'CVE-XXX' that was previously determined at block 508 and 'threat actor TA1', and apply the first LLM to the combined result to generate one or more new instructions to route to the agents.

It should be understood that some or all of the aspects of method 500 and other embodiments described herein may be performed automatically such as without human input or a human decision.

Figure 6:
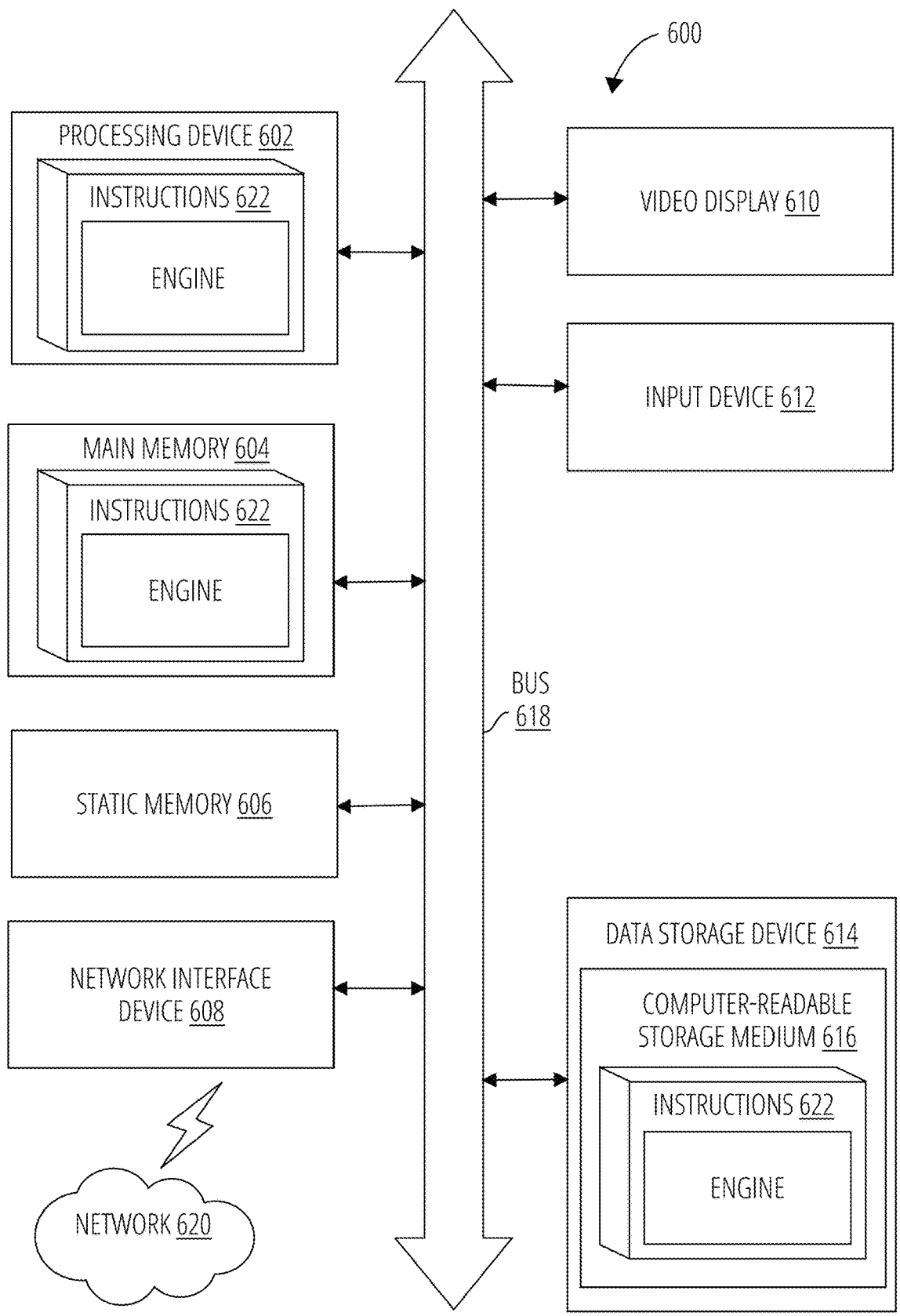
FIG. 6 illustrates an example computer system, in accordance with an embodiment.

FIG. 6 is a block diagram illustrating an example computer system 600, in accordance with one implementation of the present disclosure. This can be understood as a diagrammatic representation of a machine in the example form of a computer system within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet.

The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In some embodiments, computer system 600 may be representative of a server, such as network monitor entity 104, or an AI threat engine such as AI threat engine 226, AI threat engine 302, system 400, or processing logic to perform method 500.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 614, which communicate with each other via a bus 618. Any of the signals provided over various buses described herein may be time multiplexed with other signals and provided over one or more common buses. Additionally, the interconnection or coupling between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like.

The data storage device 614 may include a machine-readable computer-readable storage medium 616, on which is stored one or more set of instructions 622 (e.g., software) embodying any one or more of the methodologies of operations described herein, including instructions to cause the processing device 602 to execute operations of the AI threat engine 226. The instructions 622 may also reside, completely or at least partially, within the main memory 604 or within the processing device 602 during execution thereof by the computer system 600; the main memory 604; and the processing device 602 also constituting machine-readable storage media. The instructions 622 may further be transmitted or received over a network 620 via the network interface device 608.

The computer system 600 also may include a video display unit 610 (e.g., a liquid crystal display (LCD) or a cathode ray tube (CRT)) and an input device 612 (e.g., a keyboard or mouse). In one embodiment, video display unit 610 and input device 612 may be combined into a single component or device (e.g., an LCD touch screen).

A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure.

It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

When an action, function, operation, etc., is described herein as being performed automatically, this may indicate that the action, function, operation, etc., may be performed without requiring human or user input, invocation, or interaction.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances.

In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
   receiving a prompt comprising a potential security threat on a computer network;
   applying, by a processing device, a first large language model (LLM) to the prompt to generate a first instruction that is associated with a first agent that is to handle the first instruction;
   routing the first instruction to the first agent, wherein the first agent is to apply a second LLM in association with a first data source to obtain a first data that is associated with the potential security threat;
   applying a third LLM at least to the first data, to generate a data output that is associated with the potential security threat on the computer network;
   generating, based on the first data, a second instruction that is associated with a second agent that is to handle the second instruction; and
   routing the second instruction to the second agent, wherein the second agent is to apply a fourth LLM in association with a second data source that is different from the first data source, to obtain a second data associated with the potential security threat, wherein the third LLM is applied at least to the first data and to the second data to generate the data output associated with the potential security threat on the computer network that summarizes the potential security threat based on a combination of the first data and the second data;
   wherein the first data source is a structured data source and the second LLM generates a query for the structured data source to obtain the first data and wherein the second data source is an unstructured data source and the fourth LLM analyzes search results of the unstructured data source to obtain the second data, or
   wherein the first data source is the unstructured data source and the second LLM analyzes search results of the unstructured data source to obtain the second data, and wherein the second data source is the structured data source and the fourth LLM generates the query for the structured data source to obtain the first data.

2. The method of claim 1, wherein applying the second LLM comprises applying the second LLM to the first instruction to generate a database query, and querying the first data source which is a structured database with the database query to obtain the first data.

3. The method of claim 1, wherein applying the second LLM comprises searching documents in a dedicated folder based on the first instruction to obtain a relevant document, and applying the second LLM to the relevant document to obtain the first data.

4. The method of claim 1, wherein applying the second LLM comprises transmitting a request comprising the first instruction to an internet search engine to obtain relevant web pages, and applying the second LLM to the relevant web pages to obtain the first data.

5. The method of claim 1, wherein the first data and the second data comprise an indication of compromise (IoC) or common vulnerabilities and exposures (CVE).

6. The method of claim 1, wherein each of the first agent and the second agent is a microservice comprising a Representational State Transfer (REST) endpoint, and wherein each agent is coupled to a common interface through the respective REST endpoint to receive a respective instruction from the first LLM.

7. The method of claim 1, further comprising presenting the data output to a display.

8. The method of claim 1, further comprising transmitting the data output to a second computing device associated with transmission of the prompt.

9. A system, comprising:
a memory; and
a processing device, operatively coupled to the memory, to:
receive a prompt comprising a potential security threat on a computer network;
apply a first large language model (LLM) to the prompt to generate a first instruction that is associated with a first agent that is to handle the first instruction;
route the first instruction to the first agent, wherein the first agent is to apply a second LLM in association with a first data source to obtain a first data that is associated with the potential security threat;
apply a third LLM at least to the first data, to generate a data output that is associated with the potential security threat on the computer network;
generate, based on the first data, a second instruction that is associated with a second agent that is to handle the second instruction; and
route the second instruction to the second agent, wherein the second agent is to apply a fourth LLM in association with a second data source that is different from the first data source, to obtain a second data associated with the potential security threat, wherein the third LLM is applied at least to the first data and to the second data to generate the data output associated with the potential security threat on the computer network that summarizes the potential security threat based on a combination of the first data and the second data,
wherein the first data source is a structured data source and the second LLM generates a query for the structured data source to obtain the first data and wherein the second data source is an unstructured data source and the fourth LLM analyzes search results of the unstructured data source to obtain the second data, or
wherein the first data source is the unstructured data source and the second LLM analyzes search results of the unstructured data source to obtain the second data, and wherein the second data source is the structured data source and the fourth LLM generates the query for the structured data source to obtain the first data.

10. The system of claim 9, wherein to apply the second LLM comprises to apply the second LLM to the first instruction to generate a database query, and to query the first data source which is a structured database with the database query to obtain the first data.

11. The system of claim 9, wherein to apply the second LLM comprises to search documents in a dedicated folder based on the first instruction to obtain a relevant document, and to apply the second LLM to the relevant document to obtain the first data.

12. The system of claim 9, wherein to apply the second LLM comprises to transmit a request comprising the first instruction to an internet search engine to obtain relevant web pages, and to apply the second LLM to the relevant web pages to obtain the first data.

13. A non-transitory computer readable medium having instructions encoded thereon that, when executed by a processing device, cause the processing device to:
receive a prompt comprising a potential security threat on a computer network;
apply, by the processing device, a first large language model (LLM) to the prompt to generate a first instruction that is associated with a first agent that is to handle the first instruction;
route the first instruction to the first agent, wherein the first agent is to apply a second LLM in association with a first data source to obtain a first data that is associated with the potential security threat; and
apply a third LLM at least to the first data, to generate a data output that is associated with the potential security threat on the computer network;
generate, based on the first data, a second instruction that is associated with a second agent that is to handle the second instruction; and
route the second instruction to the second agent, wherein the second agent is to apply a fourth LLM in association with a second data source that is different from the first data source, to obtain a second data associated with the potential security threat, wherein the third LLM is applied at least to the first data and to the second data to generate the data output associated with the potential security threat on the computer network that summarizes the potential security threat based on a combination of the first data and the second data,
wherein the first data source is a structured data source and the second LLM generates a query for the structured data source to obtain the first data and wherein the second data source is an unstructured data source and the fourth LLM analyzes search results of the unstructured data source to obtain the second data, or
wherein the first data source is the unstructured data source and the second LLM analyzes search results of the unstructured data source to obtain the second data, and wherein the second data source is the structured data source and the fourth LLM generates the query for the structured data source to obtain the first data.

14. The non-transitory computer readable medium of claim 13, wherein to apply the second LLM comprises to apply the second LLM to the first instruction to generate a database query, and to query the first data source which is a structured database with the database query to obtain the first data.

15. The non-transitory computer readable medium of claim 13, wherein to apply the second LLM comprises to search documents in a dedicated folder based on the first instruction to obtain a relevant document, and to apply the second LLM to the relevant document to obtain the first data.

16. The non-transitory computer readable medium of claim 13, wherein to apply the second LLM comprises to transmit a request comprising the first instruction to an internet search engine to obtain relevant web pages, and to apply the second LLM to the relevant web pages to obtain the first data.

* * * * *